Feb. 28, 1961 J. LERNER 2,973,477
INTERFACE DETECTION IN DEEP HOLES
Filed Oct. 27, 1958 2 Sheets-Sheet 1

INVENTOR.
JULIUS LERNER
BY
*Robert O. Spindle*
ATTORNEY

Feb. 28, 1961          J. LERNER          2,973,477
INTERFACE DETECTION IN DEEP HOLES
Filed Oct. 27, 1958          2 Sheets-Sheet 2

INVENTOR.
JULIUS LERNER
BY
ATTORNEY

United States Patent Office 2,973,477
Patented Feb. 28, 1961

2,973,477

INTERFACE DETECTION IN DEEP HOLES

Julius Lerner, Drexel Hill, Pa., assignor to Sun Oil Company, Philadelphia, Pa., a corporation of New Jersey Filed Oct. 27, 1958, Ser. No. 769,679

8 Claims. (Cl. 324—61)

This invention relates to the detection of an interface in deep holes, and more particularly to apparatus for the detection of the hydrocarbon–brine interface in a salt storage cavern used for storage of a liquid hydrocarbon product.

The underground or subterranean storage of petroleum and retlated products is becoming more popular. Such liquid hydrocarbon (HC) product may be conveniently stored in a so-called salt storage cavern, a subterrean cavern which has been leached out or washed out of a salt dome or a salt stratum. Such a cavern, by way of example, might be 100 feet high, and 2500 feet below the surface. These caverns are ordinarily utilized for what is known as "wet storage," wherein the (less dense) hydrocarbon product is stored in a layer above a layer of salt water (brine), and the cavern is kept filled at all times with liquid. In this connection, it is pointed out that the two liquids (hydrocarbon and brine) are immisicible and have different densities. Also, as will be further explained hereinafter, these liquids have different electrical properties. In filling the cavern, the product is pumped in, and the displaced brine is either pumped or stored. When the product is removed, an equal volume of brine (or water) is put back into the cavern.

For inventory purposes, it is very desirable to be able to "gauge the cavern," that is, to determine the volume of hydrocarbon (product) therein, at any time. Formerly, inventories were customarily determined on an "in and out" basis, at best an inconvenient and somewhat unreliable mode of volume determination. Also, in many instances it is desirable to know, at a particular time, whether there is any room in the cavern for the storage of more product; the answer to this question is ascertainable from a measurement of hydrocarbon–brine interface level.

An object of this invention is to provide a novel apparatus for measuring the level of the hydrocarbon–brine interface, in a salt storage cavern used for hydrocarbon storage.

Another object is to provide a novel apparatus for measuring the interface level in a salt storage cavern, which apparatus can be installed or removed while the cavern is in use.

The objects of this invention are accomplished, briefly, in the following manner: Within the outer pipe or well casing, which extends from the surface to the top of the underground cavern and which is filled with the liquid product at all times, there is provided a detector or cable tube of small diameter, which latter also extends from the surface to the top of the cavern. The lower end of the cable tube is open, so that this tube is also filled with the liquid product at all times. By means of a cable, a suitable electrical detector is lowered from the surface down through the cable tube, out the lower open end thereof, and down toward the bottom of the cavern. When the detector leaves the end of the cable tube, a signal is generated and transmitted to the surface; this acts as a reference or fixed datum. Another signal is generated and transmitted to the surface when the detector reaches the hydrocarbon–brine interface; this is the measuring signal and indicates the distance the interface is below the datum. By measuring the cable payed out between the datum signal and the measuring signal, the depth of the interface below the top of the cavern is determined.

A detailed description of the invention follows, taken in conjunction with the accompanying drawings, wherein.

Figure 1:
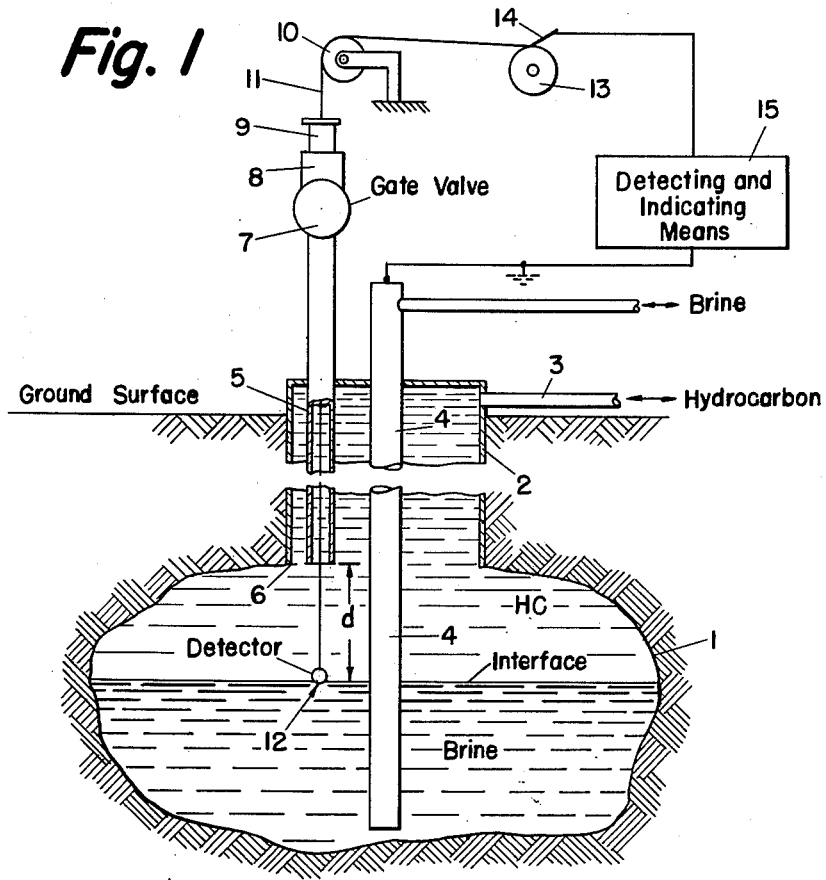
Figure 1 is a schematic diagram illustrating one form of apparatus according to this invention, in use in a salt storage cavern.

First referring to Figure 1, a subterranean salt storage cavern 1 is adapted to have stored therein a layer of liquid hydrocarbon above a layer of brine. These two liquids are of different densities and are immisicible, the interface between the liquids being denoted by a corresponding legend. Also these two liquids have different electrical properties, as will be detailed hereinafter. The cavern 1 is connected to the ground surface by an outer pipe or well casing 2 which extends from the surface to the top of cavern 1. Casing 2 is capped and a connection 3 is taken off the side, above the surface. Hydrocarbon is fed into or extracted from the cavern by means of connection 3 and casing 2, and the outer casing 2 is filled at all times with hydrocarbon or liquid product.

Piercing the cap on outer pipe 2, and extending down through the outer pipe to a point substantially at the bottom of cavern 1, is a small inner pipe 4. Pipe 4 is the brine pipe, through which saturated brine is fed into the cavern or removed therefrom. Pipe 4 is filled at all times with brine. From the above, it may be seen that the cavern 1 is fed saturated brine through the inner pipe 4, or hydrocarbon through the annulus formed by the inner pipe 4 and the outer pipe 2.

The apparatus by means of which the cavern 1 may be gauged will now be described. A small diameter tube 5 extends from the surface down through the cap of the outer pipe 2 (in the space between the inner and outer pipes), to a point even with the bottom end of the outer pipe 2, i.e., even with the top of the cavern 1, as indicated by the dotted line 6. Tube 5 is the cable tube or detector tube. The lower end of tube 5 is open, and therefore this tube is in fluid communication with outer pipe 2, so that tube 5 is filled with product (hydrocarbon) at all times, like outer pipe 2. Tube 5 extends through the cap on outer pipe 2, to a point above the top of the inner pipe 4. The top of tube 5 is provided with a gate valve 7, above which are a spool piece 8 and a stuffing box 9.

A pulley 10 is supported above the stuffing box 9 in such a manner that when a cable 11 is run down tangent to the pulley, it will enter the stuffing box. The stuffing box 9 provides a seal around cable 11, such that when gate valve 7 is open for the cable to pass therethrough, the hydrocarbon in tube 5 (which is under considerable pressure at the surface) will not leak out the upper end of this tube. Cable 11 is adapted to pass down through stuffing box 9, spool piece 8, valve 7, and tube 5, and out the lower end of this latter tube toward the bottom of the cavern 1. An interface detector 12 is connected to the end of the cable 11 that goes through the stuffing box 9. This detector operates to detect an electrical property, such as impedance, at a point in the vicinity of such detector, and will be described in more detail hereinafter. Detector 12 responds to a first change in the electrical property being detected thereby when such detector emerges from the lower end of tube 5, and responds to a second change in this property when such detector reaches the hydrocarbon–brine interface. This action will be described in more detail hereinafter.

The other end of cable 11 goes over pulley 10 to a cable drum 13. By means of a brush 14 which contacts a suitable slip ring (not shown) provided on drum 13, the upper end of cable 11 (which is electrically, as well as mechanically, connected to detector 12) is electrically connected to a detecting and indicating means 15, which latter may comprise an electrical circuit and an electrical meter, as hereinafter described. The connection from cable 11 to means 15 comprises the ungrounded input connection to such means. The ground connection to means 15 (indicated by a dotted-line ground symbol) may conveniently be made from brine pipe 4, this pipe being metallic and being connected by means of the brine (a low resistivity liquid) to the cavern wall, or earth ground. Thus, the ungrounded or high potential input connection to means 15 is from cable 11, while the grounded input connection to means 15 is from brine pipe 4.

Drum 13 is rotated, paying out cable 11 and allowing the detector 12 to drop down the cable tube 5, assuming gate valve 7 is open. When the detector 12 reaches the lower end 6 of the cable tube 5 (which end, it will be remembered, is at the top of the cavern 1), a signal is generated and transmitted to the surface by means of cable 11 as a first indication. This indication will appear on the indicator portion of unit 15. As detector 12 continues its downward travel toward the bottom of the cavern, a subsequent signal is generated when the detector reaches the hydrocarbon–brine interface (in which position the detector is illustrated in Figure 1), and this signal is transmitted to the surface as a second indication, which will appear on the indicator portion of unit 15. The first indication, read on unit 15, acts as a reference or fixed datum, and the second or subsequent indication, again read on unit 15, evinces the distance $d$ the interface level is below this datum, which latter distance is then obviously the depth of the interface, measured from the top 6 of the cavern 1.

The distance $d$ (which is the desired measurement) may be accurately determined simply by measuring the length of cable 11 payed out from drum 13, between the first or datum signal and the subsequent or measuring signal. This can be done by measuring the cable 11 directly as it runs off the drum 13, or, with proper dimensioning of the drum, the drum rotation may be correlated with cable length, the cable length being determined by the amount of drum rotation. Cable stretch can be neglected, since the amount of cable involved in the measurement of distance $d$ is only about 100 feet at the most, assuming a (reasonable) cavern height of 100 feet as aforesaid.

As previously stated, the cavern itself may be about 100 feet high, but it may be located about 2500 feet below the surface. Thus, the total length of cable tube 5 is much greater than the height of the cavern 1, and also, of course, the tube 5 is very long as compared to the distance $d$ from the top of the cavern 1 to the hydrocarbon–brine interface. If the total depth from the surface to the interface were measured by logging the total length of cable payed out as detector 12 travels from the surface to the interface, this measurement (which would utilize a very long length of cable, on the order of 2600 feet) would necessarily involve an inordinate amount of cable stretch, resulting in a large measurement of error. However, according to this invention only the rather short distance $d$ (100 feet or less) is what is measured, as a result of the provision of the first datum signal as previously described. The amount of cable involved in this distance $d$ is so small that cable stretch can be neglected, giving greatly improved accuracy of measurement.

The spool piece 8 is made of sufficient size to accommodate therein the detector 12. This spool piece is provided so that the detector 12 can be withdrawn out of tube 5 and up through valve 7 into the spool piece, after which gate valve 7 can be closed. This permits the detector and cable to be installed or withdrawn while the cavern 1 is being used for storage, without any leakage of product (hydrocarbon) through the top of tube 5.

As described, the depth $d$ of the interface below the top of the cavern may be measured with the apparatus of this invention. This depth information is useful from the standpoint of ascertaining whether there is any room in the cavern for the storage of more product (hydrocarbon). Often, however, it is desired to know for inventory purposes the actual volume of product in the cavern, at a particular time. This volume can be determined by utilizing or applying what is known as a "tank strapping curve." The "strapping curve" itself may be obtained by filling the empty cavern in steps of known amounts (or known volume), making an interface depth measurement after each step. A curve relating volume of product to interface depth may then be drawn up; by subsequent use of this "strapping curve," the volume of product in the cavern 1 at any time may be determined from the interface depth measurement made at this same time.

Figure 2:
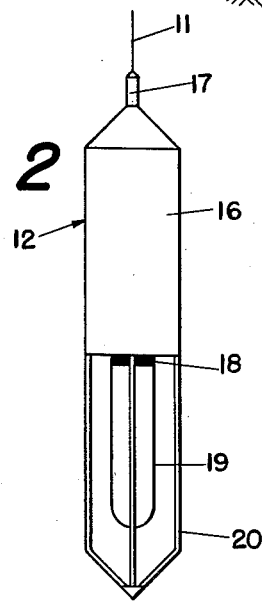
Figures 2 and 3 are two views of a detector which can be used in the apparatus of Figure 1.
Figure 3:
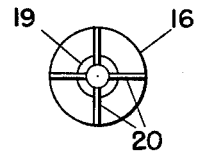

Figure 2 is a front view of a detector which can be used at 12 in Figure 1, while Figure 3 is a view looking at the bottom of this detector. The detector of Figures 2–3 utilizes a capacity-type probe whose effective capacitance depends upon the dielectric constant of the liquid surrounding or contacted by such probe. The cable 11 in this case would be a coaxial type strong enough to support the weight of the detector. On the other hand, the detector assembly must be heavy enough to pull the cable down when the same is being unreeled from drum 13 (Figure 1).

The cable 11 enters the metallic transmitter housing 16 through a pressure seal 17, this latter item also including a cable clamp. The transmitter housing 16 may contain that portion of a complete impedance (specifically, capacitance) measuring circuit which it is necessary to place immediately adjacent to the capacity-type probe. A typical example of this portion of the circuit, as well as of a complete impedance measuring circuit, is disclosed in the copending Shawhan application, Serial No. 449,437, filed October 12, 1954, now Patent Number 2,943,258, dated June 28, 1960.

Positioned below the transmitter housing 16, but insulated therefrom by an insulating member 18, is the capacity-type metallic probe 19 itself. This probe is illustrated as located below the housing 16, but it can be above such housing, or even around it. Although the probe 19 is insulated from the metallic housing 16, it is pointed out that this probe functions as the high-potential or ungrounded plate of a condenser, and is electrically connected to certain components contained inside housing 16, as disclosed in the aforementioned Shawhan application. For protection of the probe 19, a cage 20 can be provided around such probe. This cage may comprise several (e.g., four) spaced metallic members extending downwardly from housing 16, these members surrounding probe 19 and having portions which extend radially inwardly to meet each other below probe 19, as illustrated in Figure 3. If desired, the probe itself may be constructed in the manner disclosed in the copending Lerner and Geniesse application, Serial No. 760,768, filed September 12, 1958.

The remainder of the capacitance measuring circuitry (e.g., the circuitry connected to that end of the cable remote from the measuring and reference capacitances, in the aforementioned Shawhan application) is located at the surface, in the box 15. Although the ground connection is illustrated in Figure 1 as being made to the brine pipe 4, this has been done merely for the sake of ease in illustration; actually, if a coaxial cable is used for 11 (as previously stated by way of example), the ground connection to means 15 would be made to the outer conductor of the coaxial cable, which would be earthed at a suitable point.

As the probe and transmitter assembly of Figures 2 and 3 goes down the cable tube 5, a certain capacitance will be presented between the probe 19 and the cable tube inside wall (the cable tube being metallic and being earthed through casing 2, for example), with the hydrocarbon, a non-conductor, as the dielectric. In this connection, it will be recalled that the cable tube 5 is filled with hydrocarbon at all times. This initial capacitance with respect to ground results in a certain signal being generated, and indicated on the indicating means 15 at the surface.

When the probe emerges from the lower end 6 of the cable tube 5, it will present a greatly decreased capacitance with respect to ground; now the capacitance is that between the probe 19 and the wall of cavern 1 (which is a ground point since the cavern is underground), added to that between the probe and the inner (brine) pipe 4 (which is also a ground point), again with hydrocarbon as the dielectric. Because of the (now) increased spacing of the capacitor plates, the capacitance presented is decreased. Thus, there is an abrupt drop in capacitance when the detecting probe leaves the lower end 6 of the cable tube; this decreased capacitance results in a decreased signal being generated and indicated on means 15 at the surface. This decrease in signal strength acts as a reference or fixed datum, which is the zero point for the cable measurement previously referred to.

If the probe is lowered further until it enters the brine, an interface marking signal will be generated just as the hydrocarbon–brine interface is reached. Brine is a good electrical conductor. Therefore, in the case of a bare probe, the probe will be shorted out, since there will then be a good conducting path between such bare probe and the grounded inner pipe 4. The circuit 15 can be arranged to indicate this situation. The shorting out will result in a large signal being generated and indicated on means 15 at the surface. This large signal provides the measuring signal, which indicates the end or terminal point for the cable measurement previously referred to. Thus, the length of cable payed out between the datum and measuring signals represents the distance $d$ from the top of the cavern to the hydrocarbon–brine interface level.

In the case of a probe 19 coated with insulating or dielectric material, the capacitance with respect to ground presented by the probe will increase sharply when the interface level is reached, since the brine, being a good electrical conductor, in effect moves the grounded plate of the condenser very closely to the probe, in fact, such grounded plate is moved right up to the outside of the dielectric coating. In this case, the capacitance measured (by means of circuit 15) in the brine, at the hydrocarbon–brine interface, depends on the diameter of the probe, together with the thickness and the dielectric constant of the probe coating. In this case, also, a large measuring signal will be generated when the hydrocarbon–brine interface is reached by the probe.

Figure 4:
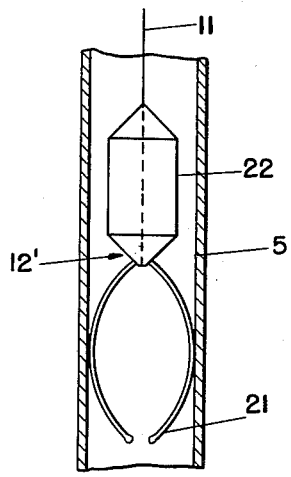
Figure 4 illustrates another type of detector.

Figures 2 and 3 disclose a detector which detects the electrical property or electrical impedance characteristic known as capacitance. Alternatively, it is possible to use a detector which detects the electrical property or electrical impedance characteristic known as conductance or resistance. Such a detector 12' is illustrated in Figure 4, to which reference will now be made. This figure illustrates a detector 12' in the cable tube 5. Two metallic, electrically conducting spring feelers 21 are mechanically secured and electrically connected to the lower end of cable 11. These feelers are of such dimensions as to contact the wall of tube 5, when the detector 12' is located therein. To make the detector assembly 12' sufficiently heavy to pull the cable 11 down when the latter is unreeled from drum 13, a weight 22 is positioned above the feelers 21, and is secured in position on cable 11 in any suitable or convenient manner.

It will be appreciated that both the cable tube 5 and the brine pipe 4 are earthed or grounded. This has been explained previously. In the case of the detector 12', a simple ohmmeter may be used in box 15 at the surface, one of the two input connections to the ohmmeter being grounded or earthed (as by way of brine pipe 4) and the other being connected to insulated cable 11, for example by way of brush 14 (see Figure 1).

In going down the cable tube 5, the spring feelers 21 contact the tube wall, and complete an electrical circuit, from cable 11 to feelers 21, thence to tube 5 or ground. The ohmmeter in unit 15 then indicates minimum (substantially zero) resistance.

When the detector 12' leaves the open lower end 6 of the cable tube 5, the feelers no longer contact this tube, instead making contact only with the non-conducting hydrocarbon. This breaks the circuit from such feelers or cable 11 to ground, or in other words makes the circuit have a high resistance. The ohmmeter at the surface indicates this extremely high resistance. This is the reference or datum signal, which marks the zero point of the cable measurement.

If the detector 12' is lowered further until it reaches the brine, an interface marking or measuring signal will be generated. Then, the circuit is completed through the conducting brine from feelers 21 or cable 11 to the brine pipe 4 or ground. The ohmmeter at the surface then indicates very low resistance. This is the measuring signal, which marks the end or terminal point for the cable measurement. Again, the length of cable payed out between the datum and measuring signals represents the distance $d$ from the top of the cavern to the hydrocarbon–brine interface level.

It has been stated that the hydrocarbon in the cable tube 5, and also in well casing 2, is under considerable pressure at the ground surface, particularly if the well to the cavern is deep, on the order of 2500 feet, for example. This is the reason for utilizing the cable stuffing box in Figure 1.

Figure 5:
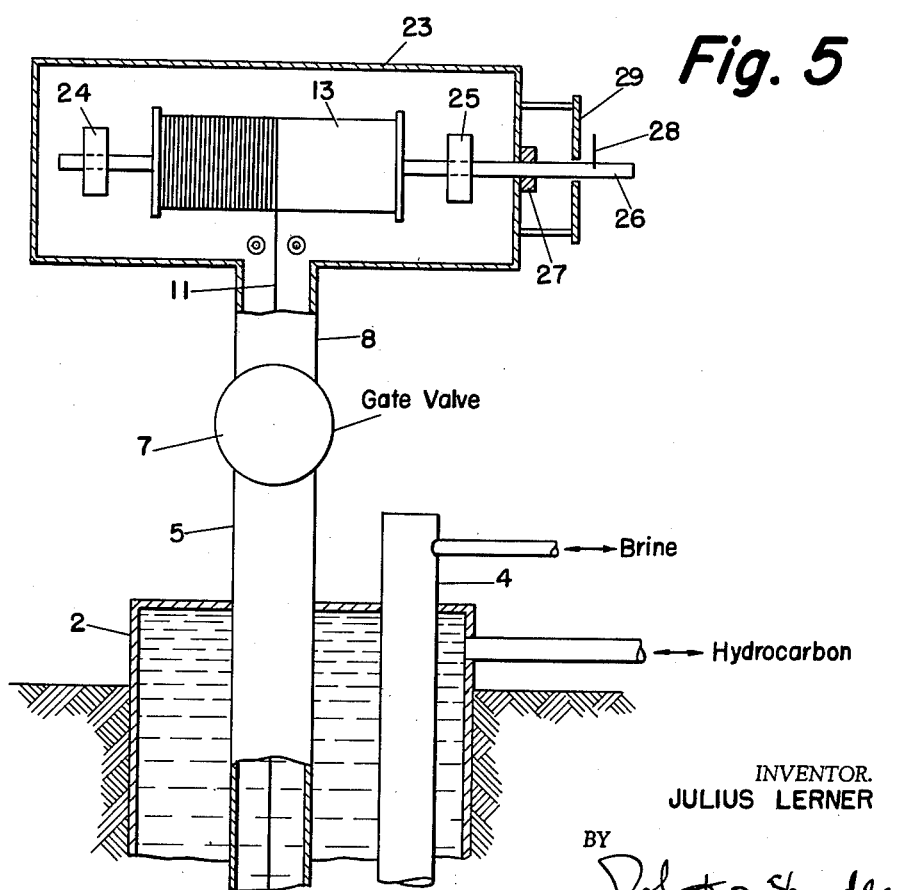
Figure 5 is a schematic diagram illustrating an alternative form of cable operating equipment.

Figure 5 illustrates an arrangement alternative to Figure 1, which renders unnecessary a cable stuffing box. The Figure 5 arrangement is similar to that illustrated in Figure 1, up to the top of the spool piece 8. Parts the same as those in Figure 1 are designated by the same reference numerals.

In Figure 5, the stuffing box is replaced by a pressure tight chamber 23 containing the cable drum 13. In this arrangement, the cable drum is located directly over the cable tube 5, and is mounted in drum bearings 24 and 25. Drum 13 is rotated by means of a drum shaft 26 coming out of the chamber 23 through a shaft seal 27. In this arrangement, the length of cable payed out between the datum and measuring signals is measured or indicated by means of a pointer 28 fixed to the drum shaft 26 and cooperating with a stationary dial 29 attached to the outside of chamber 23. The indicator 28, 29 shows the amount of rotation of the cable drum 13.

It would be possible to make the chamber or housing 23 large enough to enclose the drive motor for the drum 13, as well as the drum itself. In this case, the drum rotation indications could be transmitted to the outside of the housing by electrical means.

The invention claimed is:

1. In an underground storage cavern for storing a layer of one liquid above a layer of a different liquid, said liquids being immiscible and having different densities, thereby to provide an interface therebetween, said liquids also having different electrical impedances, thereby to provide an impedance change at said interface: apparatus for detecting the interface level in said cavern comprising a tube having an open lower end and extending from the surface to the top of said cavern, the total length of said tube being much greater than the distance from the top of the cavern to said interface, said tube being filled at all times with the lower-density liquid, and the cross-sectional area of said tube being small as compared to the cross-sectional area of said cavern, thereby to provide, at the lower end of said tube, a substantial change in the electrical impedance presented to an impedance sensing element; a sensing element for sensing the electrical impedance presented thereto, means mechanically connected to said element for lowering the same downwardly through said tube and out the lower end thereof to said interface, and means electrically connected to said element for indicating at the surface the electrical impedance sensed by said element.

2. In a subterranean salt storage cavern for storing a layer of liquid product above a layer of brine, said product and said brine having different electrical impedances, thereby to provide an impedance change at the product-brine interface: apparatus for detecting the interface level in said cavern comprising a tube having an open lower end and extending from the surface to the top of said cavern, the total length of said tube being much greater than the distance from the top of the cavern to said interface, said tube being filled at all times with product, and the cross-sectional area of said tube being small as compared to the cross-sectional area of said cavern, thereby to provide, at the lower end of said tube, a substantial change in the electrical impedance presented to an impedance sensing element; a sensing element for sensing the electrical impedance presented thereto, means mechanically connected to said element for lowering the same downwardly through said tube and out the lower end thereof to said interface, and means electrically connected to said element for indicating at the surface the electrical impedance sensed by said element.

3. In a subterranean salt storage cavern for storing a layer of liquid hydrocarbon above a layer of brine: apparatus for detecting the level of the hydrocarbon-brine interface in said cavern comprising a tube having an open lower end and extending from the surface to the top of said cavern, the total length of said tube being much greater than the distance from the top of the cavern to said interface, said tube being filled at all times with hydrocarbon, and the cross-sectional area of said tube being small as compared to the cross-sectional area of said cavern, thereby to provide, at the lower end of said tube, a substantial change in the electrical impedance presented to an impedance sensing element; a sensing element for sensing the electrical impedance presented thereto, means mechanically connected to said element for lowering the same downwardly through said tube and out the lower end thereof to said interface, and means electrically connected to said element for indicating at the surface the electrical impedance sensed by said element.

4. In a subterranean salt storage cavern for storing a layer of liquid product above a layer of brine, said product and said brine having different electrical impedances, thereby to provide an impedance change at the product-brine interface: an outer product pipe extending from the surface to the top of said cavern, said pipe being filled at all times with product, a tube within said outer pipe and extending from the surface to the top of said cavern, the total length of said tube being much greater than the distance from the top of the cavern to said interface, said tube having a lower open end so it is in fluid communication with said pipe and therefore is filled at all times with product, and the cross-sectional area of said tube being small as compared to the cross-sectional area of said cavern, thereby to provide, at the lower end of said tube, a substantial change in the electrical impedance presented to an impedance sensing element; a sensing element for sensing the electrical impedance presented thereto, means mechanically connected to said element for lowering the same downwardly through said tube and out the lower end thereof to said interface, and means electrically connected to said element for indicating at the surface the electrical impedance sensed by said element.

5. Apparatus as defined in claim 1, wherein the sensing element comprises a capacity-type probe whose capacitance depends upon the dielectric constant of the liquid contacted by such probe.

6. Apparatus as defined in claim 3, wherein the sensing element comprises an electrically conductive member, the resistance between such member and an electrically conductive element spaced therefrom depending upon the resistivity of the liquid contacted by said member.

7. Apparatus as defined in claim 3, wherein the sensing element comprises a capacity-type probe whose capacitance depends upon the dielectric constant of the liquid contacted by such probe, and wherein the means for lowering the sensing element includes a cable attached to such probe.

8. The combination defined in claim 4, wherein the sensing element comprises a capacity-type probe whose capacitance depends upon the dielectric constant of the liquid contacted by such probe.

References Cited in the file of this patent

UNITED STATES PATENTS

| | | |
|---|---|---|
| 2,167,066 | Elliott | July 25, 1939 |
| 2,184,338 | Ennis | Dec. 26, 1939 |
| 2,204,196 | Straatman | June 11, 1940 |
| 2,473,713 | Kingston et al. | June 21, 1949 |
| 2,524,933 | Silverman | Oct. 10, 1950 |
| 2,632,324 | Oberlin | Mar. 24, 1953 |
| 2,785,374 | Fay et al. | Mar. 12, 1957 |
| 2,843,823 | Bayless | July 15, 1958 |